United States Patent [19]

Regan et al.

[11] 4,150,928
[45] Apr. 24, 1979

[54] APPARATUS FOR MAKING DOUBLE ANGLE V-BELT

[75] Inventors: Joseph P. Regan; James R. Thomas, both of Springfield, Mo.

[73] Assignee: Dayco Corporation, Dayton, Ohio

[21] Appl. No.: 926,982

[22] Filed: Jul. 21, 1978

[51] Int. Cl.² ............... B29C 17/00; B29D 29/00; B29H 7/22
[52] U.S. Cl. .................... 425/40; 425/28 B; 425/43
[58] Field of Search .......... 425/28 B, 35, 34 B, 425/40, 43, 39

[56] References Cited

U.S. PATENT DOCUMENTS

| | | | |
|---|---|---|---|
| 2,518,137 | 8/1950 | Gorecki | 425/40 |
| 2,600,775 | 6/1952 | Hurry et al. | 425/34 B X |
| 2,602,188 | 7/1952 | Gorecki | 425/28 B |
| 3,085,287 | 4/1963 | Wach | 425/40 |

FOREIGN PATENT DOCUMENTS 26281 12/1963 Japan .................... 425/28 B

Primary Examiner—J. Howard Flint, Jr.
Attorney, Agent, or Firm—Reuben Wolk

[57] ABSTRACT

A method for making double angle V-belts is provided which comprises providing an uncured belt body, placing at least a portion of the length of such body in a mold comprising a pair of mating mold sections which, when closed, provide an elongated cavity having a double truncated V cross-section, closing the mold sections, applying uniform resilient pressure to opposite sides of the belt body while confined in the mold, curing the body portion, releasing the pressure, opening the mold and removing the resulting molded and cured belt portion.

Also provided is a mold for simultaneously molding and curing a double angle V-belt which comprises a pair of mating mold sections, each section comprising an elongated, generally symmetrical trapezoidal cavity and having means for applying resilient pressure at the apex of the cavity.

4 Claims, 6 Drawing Figures

APPARATUS FOR MAKING DOUBLE ANGLE V-BELT

BACKGROUND OF THE INVENTION

This invention relates to an improved transmission belt and apparatus for its manufacture, particularly double V-type belts.

It is well known that transmission belts are used for transferring power from a driving pulley to a driven pulley by passing the belt in a continuous manner around the pulleys. Often times because of limitations of space or design, it is necessary to utilize a double V-type belt which will transmit power with equal facility and efficiency regardless of the direction of flexure about a neutral axis plane extending longitudinally of the belt.

The double V-type belts have a central strength section and sections on either side which may be considered as either tension or compression sections, depending on the relationship of the belt to the pulley. These belts can be manufactured by concentrically assembling the various sections, cutting them into belt bodies, and vulcanizing them to form an integral structure. A cover fabric may be applied to the belt body prior to vulcanization.

In building up the belt body prior to molding and curing, relatively close tolerances are required to produce a satisfactory belt. The belt body may have a cross-sectional area greater than the cross-sectional area of the mold, in which cause a portion of the stock of the body is squeezed out of the mold. Or, the belt body may have a smaller cross-sectional area than the area of the mold, in which case the strength cord line may be displaced or skewed.

U.S. Pat. No. 3,164,026, issued Jan. 5, 1965 to Terhune, describes a method for manufacturing double V-type belts which comprises adding a blowing agent to the belt body at both sides of the neutral axis, or cord line, and heat curing the belt to blow a limited portion of the body at both sides of the neutral axis to expand and stretch the cover. This method requires an additional manufacturing step in order to incorporate the blowing agent into at least a portion of the stock which makes up the belt body.

U.S. Pat. Nos. 2,518,137, issued Aug. 8, 1950 and 2,602,188, issued July 8, 1952, both to Gorecki, disclose molds for manufacturing single V-type belts, which have resilient means for applying pressure to the inner radial force of the belt during curing. The devices and methods described therein have not been employed in the manufacture of double V-type belts.

Accordingly, it is an object of the present invention to provide an improved apparatus for manufacturing double V-type belts.

Other objects, aspects and advantages of the present invention will be apparent from the accompanying drawings and the following detailed description.

SUMMARY OF THE INVENTION

In accordance with the present invention there is provided an improved apparatus employed in the method for making an endless belt having a double truncated V cross-section, also referred to herein as a double V-type belt, which comprises the steps of providing an uncured belt body, placing at least a portion of the belt body in a mold comprising a pair of mating mold sections, each section having at least one elongated, generally symmetrical trapezoidal cavity. These sections, when closed upon each other, providing a resulting elongated cavity having a double truncated V cross-section, the inner bottom surface of each of the trapezoidal cavities having means for applying uniform resilient pressure along the length of the cavity when the body portion is enclosed therein; closing the mold sections, thereby confining the body portion in the elongated cavity; applying pressure to both sides of the body portion by way of the pressure applying means; curing the body portion confined in the mold; releasing the pressure; and opening the mold and removing the molded and cured belt portion therefrom.

Also provided is an improved mold for molding and curing a double truncated V-belt, as hereinafter described.

Further, there is provided an improved double V-type belt.

DETAILED DESCRIPTION OF THE DRAWING

Figure 1:
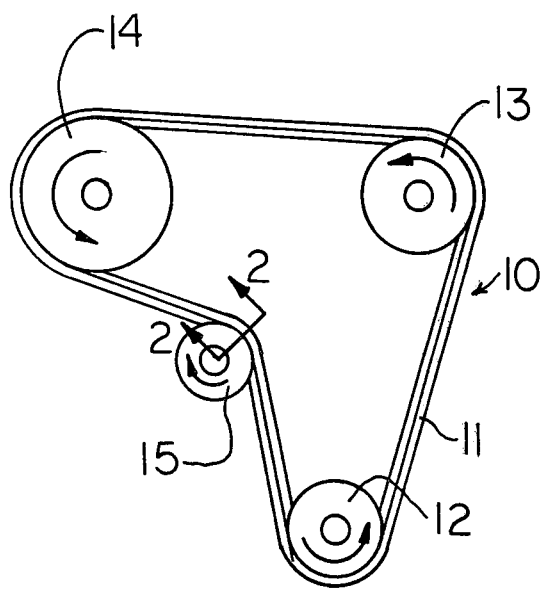
FIG. 1 illustrates the use of a double V-type belt for rotating pulleys in opposite direction.

Reference is now made to FIG. 1 of the drawing which illustrates a drive system 10 which utilizes one exemplary embodiment of an endless double V-type belt which is designated generally by the reference numeral 11. The drive system 10 employs a plurality of belt pulleys or sheaves having configurations and diameters as determined by their associated driving and driven components. For example, the drive system 10 employs a driving sheave 12 which is operatively connected to a motor or engine or other source of rotary power, not shown, and driven sheaves 13, 14 and 15 which are operatively connected to devices requiring rotary power. The belt 11 is disposed around the sheaves 12, 13, 14 and 15. The driving sheave 12 and the driven sheaves 13 and 14 rotate in the same direction while the driven sheave 15 rotates in the opposite direction.

Figure 2:
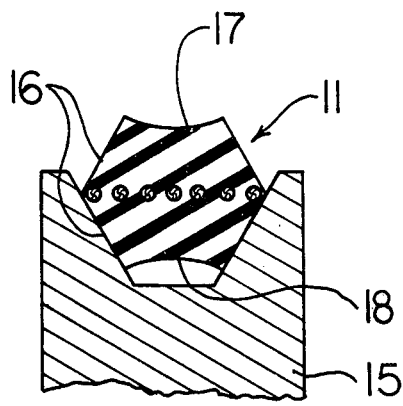
FIG. 2 is a fragmentary sectional view of a double V-type belt positioned in a pulley taken along line 2—2 of FIG. 1.

The belt 11 is hexagonal shaped in cross-section, as illustrated in FIG. 2, and comprises side traction surfaces 16 and top and bottom surfaces 17 and 18, respectively.

Figures 3, 4, 5:
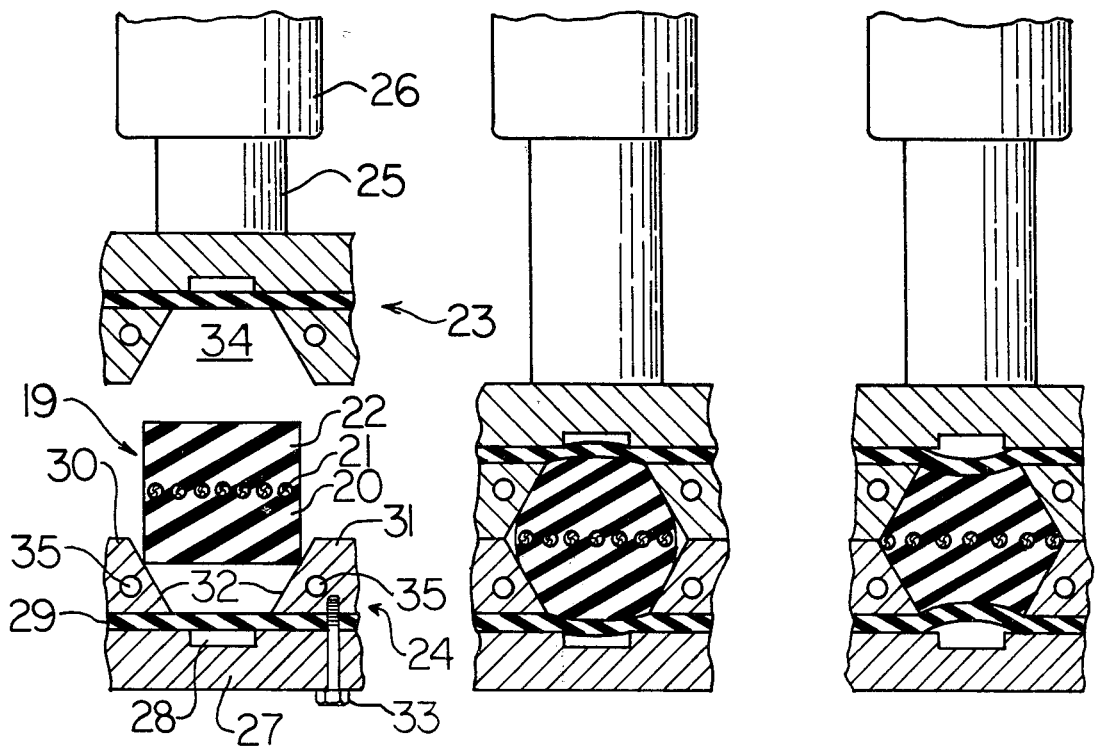
FIG. 3 is a sectional view taken through a belt mold employing an embodiment of this invention, showing the belt mold in the open position and a belt carcass in position for molding.
FIG. 4 is a sectional view illustrating an intermediate step in the method of this invention.
FIG. 5 is a sectional view illustrating another step in the method of this invention.

The belt 11 is made up by building a belt sleeve (not shown) from which square belt carcasses 19 are cut. Referring now to FIG. 3, the belt carcass 19 comprises a layer 20 of elastomeric material, hereinafter referred to as compression layer 19, a layer of helically-wound load-carrying cord 21, and a layer 22 of elastomeric material, hereinafter referred to as tension layer 22. It will be recognized by those skilled in the art that the designations "compression" and "tension" are made for the sake of convenience of description, and do not refer to the direction of flexure of the finished belt. It will also be recognized that the belt carcass 19 may be square cut, as shown, or double-angle cut; and that the carcass may be cut edge, as shown in FIG. 3; or, as shown in FIG. 6, wrapped with one or more fabric cover layers, or laminated.

Figure 6:
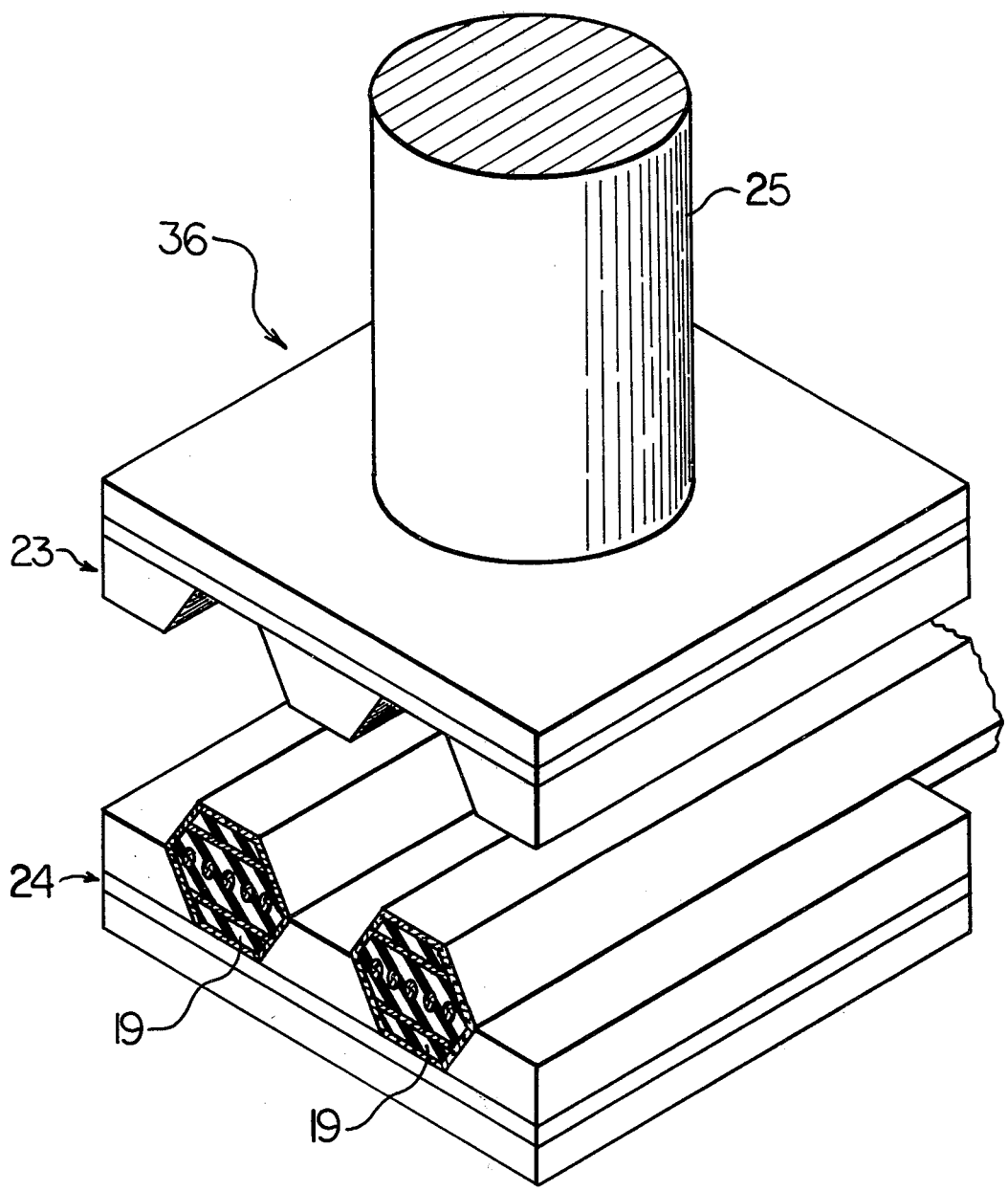
FIG. 6 is a perspective view illustrating one form of an apparatus that can be utilized to practice this invention.

Referring now to FIG. 6, an improved apparatus 36 of this invention is shown. A portion of the apparatus 36 is shown in greater detail in FIG. 3. The belt carcass 19 is shown in FIG. 3 positioned in the apparatus 36 which comprises an upper mold section 23 and a lower mold section 24. The lower mold section 24 may be stationary and the upper mold section may be movable. The upper mold section 23 may be moved vertically toward and away from the lower mold section 24 by means of hydraulic piston 25 which operates in hydraulic cylinder 26.

The upper and lower mold sections 23 and 24 are essentially identical; for convenience of description, only the lower mold section 24 will be described in detail. This mold section 24 comprises a flat member 27 having a recessed portion 28, a flat resilient member 29, and at least two cavity-forming member 30 and 31, each having at least one inclined face 32. These members can be assembled, for example, by a bolt 33 extending through holes in the flat member 27 and the resilient member 29 and into a threaded hole in the recess-forming member 31. When assembled together the members 27, 29, 30 and 31 cooperate to form an elongated mold cavity 34, this cavity being of trapezoidal cross-section, with the base of the trapezoid opening toward the opposite mold member. The recessed portion 28 in the flat member 27 is located below the resilient member 29 at the apex of cavity 34. Thus, when the upper mold section 23 is closed upon the lower mold section 24 the resulting elongated cavity has a double truncated V cross-section, as shown in FIGS. 4 and 5.

The resilient member 29 is a rubber material capable of withstanding repeated heating cycles, such as butyl rubber.

The recess 28 is elongated, yet slightly shorter in length than the cavity 34. The flat member 27 is provided with a suitable fitting, not shown, at one end of the recessed portion 28 for connecting the recessed portion 28 to a suitable source of fluid under pressure. The pressure fluid may be compressed air, steam as a hydraulic fluid.

In operation, no pressure fluid is initially introduced into the recessed portions 28. The carcass 19 is positioned in the lower cavity 34 and the upper mold section 23 is closed upon the lower mold section 24. Upon the closing of the mold sections 23 and 24 any excess volume of the carcass 19 is relieved by pushing outwardly the resilient members 29, as shown in FIG. 4. This permits complete closing of the upper mold section 23 upon the lower mold section 24. After the mold sections are closed, fluid under pressure is introduced into the recessed portions 28, thereby forcing the resilient members 29 into the carcass 19, as shown in FIG. 5, which in turn forces the carcass 19 to fill out the mold cavity.

The upper and lower mold sections 23 and 24 are provided with a plurality of heating means for subjecting the carcass 19 to heat and pressure for a sufficient length of time to properly cure the same. These heating means may be electrical heaters, or, as shown in FIGS. 3–5, may be fluid passageways 35 through which a heated fluid, such as steam or hot water, may be passed.

After the belt carcass 19 has been subjected to heat and pressure for a suitable period of time, the pressure in the recesses 28 may be relieved. The upper mold section 23 is then moved away from the lower mold section 24 and the resulting cured belt carcass may be removed from the mold. The belt carcass 19 is advanced in the mold to the next uncured portion and the above-described process is repeated as necessary until the entire length of the belt is cured.

An advantage of the present invention is that curing pressure is applied to the belt carcass after the mold is fully closed. Thus, excess stock cannot be squeezed out of the mold, thereby eliminating a post-curing trimming operation.

Another advantage is that greater variations in belt volume are tolerated, thus reducing rejects from "light" belts.

A further advantage is that hydraulic presses are not necessary. A lifting mechanism may be required to open and close the mold sections. Once closed, the mold sections may be held closed by mechanical snap locks; pressure to form the belt is provided by the pressure fluid introduced into the recessed portions of the mold sections.

Various modifications and embodiments of the invention will be apparent to those skilled in the art in view of the disclosure.

We claim:

1. A mold for simultaneously molding and curing at least a portion of an endless belt made primarily of elastomeric material and having a double truncated V cross-section, which comprises a first mold section and a mating second mold section, each of said mold sections comprising a first flat member having a first planar surface and a second planar surface, said second planar surface having an elongated recessed portion therein; a second flat member having a first planar surface and a second planar surface, said second flat member being resilient and said first planar surface of said second flat member being in contact with said first flat member; at least two cavity forming members, each having a first parallel face, a second parallel face and at least one inclined face, said first parallel faces being in contact with said second planar surface of said second flat member; and means for assembling said first flat member, said second flat member and said cavity forming members; wherein, when assembled together, said cavity forming members and said resilient second flat member cooperate to form an elongated mold cavity having a trapezoidal cross-section wherein the base of said trapezoidal cavity opens outwardly toward the opposite mating mold section, and wherein said recessed portion in said first flat member is located below said resilient second flat member at the apex of said cavity.

2. The mold of claim 1 further comprising means for securing said first mold section in a stationary position and means for moving said second mold section toward and away from said first mold section.

3. The mold of claim 1 additionally comprising means for passing a fluid through each of said mold sections to alter the temperature of said mold.

4. The mold of claim 1 wherein said resilient second flat member is a rubber material.